(12) United States Patent
Wang et al.

(10) Patent No.: US 11,460,064 B2
(45) Date of Patent: Oct. 4, 2022

(54) SNAP CONNECTION ASSEMBLY

(71) Applicant: ILLINOIS TOOL WORKS INC., Glenview, IL (US)

(72) Inventors: Xing Wang, Shanghai (CN); Mengli Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/132,312

(22) Filed: Dec. 23, 2020

(65) Prior Publication Data

US 2021/0199147 A1 Jul. 1, 2021

(30) Foreign Application Priority Data

Dec. 25, 2019 (CN) .......................... 201911354454.8
Jul. 29, 2020 (CN) .......................... 202010743927.X
Nov. 27, 2020 (CN) .......................... 202011356104.8

(51) Int. Cl.
*F16B 21/08* (2006.01)
*H01R 13/74* (2006.01)

(52) U.S. Cl.
CPC ......... *F16B 21/086* (2013.01); *H01R 13/741* (2013.01)

(58) Field of Classification Search
CPC ............ F16B 2005/0678; F16B 5/0056; F16B 5/0664; H01R 4/34; H01R 13/743; H01R 13/631; H01R 13/639; H01R 13/58
See application file for complete search history.

(56) References Cited

U.S. PATENT DOCUMENTS

| 5,514,000 A * | 5/1996 | Krause ............... H01R 13/6315 439/248 |
| 2006/0199128 A1* | 9/2006 | Moskwa ................. F23D 14/46 431/343 |
| 2012/0003868 A1* | 1/2012 | Daugherty ........... H01R 13/518 439/540.1 |
| 2014/0165727 A1* | 6/2014 | Mueller .................... G01P 3/44 73/514.39 |
| 2014/0273650 A1 | 9/2014 | Reeves |

FOREIGN PATENT DOCUMENTS

WO 2009053778 A1 4/2009

OTHER PUBLICATIONS

Search Report, related European Application No. 20216590.8, dated May 14, 2021, 11 pages.

* cited by examiner

*Primary Examiner* — Jean F Duverne
(74) *Attorney, Agent, or Firm* — Quarles & Brady LLP

(57) ABSTRACT

The present disclosure provides a fastener for supporting and connecting two electric connectors. The fastener comprises a support portion provided with a support surface on a top portion thereof, a connecting hole penetrating the support surface and extending into the support portion, and a pair of clamping shoulders respectively arranged on opposing first and second sides of the support portion. The pair of clamping shoulders are made of a first elastic material at least at top portions thereof such that, when the fastener is mounted in a receiving slot of a fastener receiving member, the pair of clamping shoulders can be pressed against the fastener receiving member to provide an amount of elastic deformation, which enables the fastener to move a certain distance toward the electric connectors relative to the fastener receiving member when the fastener is connected to the electric connectors.

20 Claims, 6 Drawing Sheets

SNAP CONNECTION ASSEMBLY

CROSS REFERENCE TO RELATED APPLICATIONS

This application relates to and claims priority to Chinese Patent Application No. 202011356104.8 filed on Nov. 27, 2020, Chinese Patent Application No. 20201074397.X filed on Jul. 29, 2020, and Chinese Patent Application No. 201911354454.8 filed on Dec. 25, 2019, which are hereby incorporated by reference in their entirety.

FIELD OF DISCLOSURE

The present disclosure relates to the field of batteries and battery modules, and more specifically to a fastener and a fastener assembly at an end of a battery module.

BACKGROUND

In general, it is necessary to electrically connect an electric connector of a battery module to another electric connector by means of a fastener assembly. The fastener assembly comprises a fastener and a fastener receiving member. Specifically, the fastener is partially inserted into the fastener receiving member, and the two electric connectors are electrically connected to each other and supported on the fastener so as to transfer the power from the battery module.

SUMMARY OF THE DISCLOSURE

In one aspect, the present disclosure provides a fastener for supporting and connecting two electric connectors, the fastener comprises a support portion provided with a support surface on a top portion thereof, a connecting hole penetrating the support surface and extending into the support portion, and a pair of clamping shoulders respectively arranged on opposing first and second sides of the support portion and formed by protruding outwardly from the support portion. The pair of clamping shoulders are made of a first elastic material at least at top portions thereof such that, when the fastener is mounted in a receiving slot of a fastener receiving member, the pair of clamping shoulders can be pressed against the fastener receiving member to provide an amount of elastic deformation, which enables the fastener to move a certain distance toward the electric connectors relative to the fastener receiving member when the fastener is connected to the electric connectors.

According to the first aspect mentioned above, the fastener comprises at least one elastic leg provided at a bottom portion of the support portion, wherein the at least one elastic leg is configured such that it is elastically deformed during the mounting process of the fastener to the receiving slot of the fastener receiving member so as to enable the fastener to move in a first direction relative to the fastener receiving member, and that it restores the free state after the fastener is mounted to the receiving slot of the fastener receiving member so as to prevent the fastener from moving in the first direction relative to the fastener receiving member.

According to the first aspect mentioned above, the at least one elastic leg extends from a third side of the support portion toward a fourth side of the support portion, and at least part of the elastic leg extends downwardly beyond a bottom surface of the support portion below the connecting hole.

According to the first aspect mentioned above, the support portion is made of a second elastic material, and the first elastic material has an elasticity coefficient greater than that of the second elastic material.

According to the first aspect mentioned above, the pair of clamping shoulders each has an upper portion and a lower portion, the upper portion of the clamping shoulder is made of the first elastic material, and the lower portion of the clamping shoulder is made of the second elastic material; and the support portion and the lower portions of the pair of clamping shoulders are integrally formed, and the upper portions of the pair of clamping shoulders are integrally formed on the support portion and the lower portions of the pair of clamping shoulders by means of an injection molding process.

According to the first aspect mentioned above, an inner surface of the connecting hole is provided with threads.

According to the first aspect mentioned above, the fastener further comprises a connector arranged in the connecting hole, and the connector is provided with a screwed hole having threads on an inner surface thereof.

According to the first aspect mentioned above, the support portion is connected to the connector by means of injection molding.

According to the first aspect mentioned above, the connector comprises a connector main body and a pair of mounting structures, the pair of mounting structures is arranged on opposite sides of the connector main body, the connector main body is arranged in the connecting hole, and the connector is connected to the support portion by means of the pair of mounting structures. The connector main body is provided with the screwed hole.

According to the first aspect mentioned above, the pair of mounting structures each comprises a biased arm. One end of the biased arm is connected to the connector main body, and the other end thereof is a free end. The biased arm is configured to enable the connector to be connected to the support portion when in a free state, and the biased arm can be deformed under a force.

According to the first aspect mentioned above, the pair of mounting structures each further comprises an extension arm. The extension arm is formed by extending outwardly and then downwardly from the connector main body, the extension arm is provided with a window, and the biased arm extends from an edge of the window upwardly and obliquely relative to the extension arm.

According to the first aspect mentioned above, the first elastic material is thermoplastic elastomer, and the second elastic material is thermoplastic resin.

According to the first aspect mentioned above, the first side is a left side, the second side is a right side, the third side is a rear side, and the fourth side is a front side.

In a second aspect, the present disclosure provides a fastener assembly for supporting and connecting two electric connectors, the fastener assembly comprises a fastener and a fastener receiving member. The fastener comprises: a support portion being provided with a support surface on a top portion thereof; a connecting hole penetrating the support surface and extending into the support portion; and a pair of clamping shoulders being respectively arranged on opposing first and second sides of the support portion and formed by protruding outwardly from the support portion. The fastener receiving member has a receiving slot, the fastener is inserted into the receiving slot of the fastener receiving member in a first direction, the top portion of the receiving slot is provided with a pair of limiting protrusions protruding toward each other, the limiting protrusion is configured to cooperate with the pair of clamping shoulders to limit the movement of the fastener relative to the fastener receiving member in a second direction perpendicular to the first direction. The pair of limiting protrusions are made of a first elastic material at least at bottom portions thereof, and/or the pair of clamping shoulders are made of a first elastic material at least at the top portions thereof such that, when the fastener is mounted in the receiving slot of the fastener receiving member, the pair of clamping shoulders and the fastener receiving member can press against each other to provide an amount of elastic deformation, which enables the fastener to move a certain distance toward the electric connectors relative to the fastener receiving member when the fastener is connected to the electric connectors.

According to the second aspect mentioned above, the bottom portion of the pair of limiting protrusions of the fastener receiving member is made of the first elastic material, and the rest of the fastener receiving member is made of a metal material; or the top portion of the pair of clamping shoulders of the fastener is made of the first elastic material, and the rest of the fastener is made of a second elastic material. The first elastic material having an elasticity coefficient greater than that of the second elastic material.

The fastener and the fastener assembly provided by the present disclosure can eliminate the clearance between the electric connectors and the fastener, so as to achieve more reliable connection of the electric connectors and further reduce the abnormal noise due to the partial loosening between the electric connectors in a high or low temperature environment, avoiding failure of the electric connection between the electric connectors.

DETAILED DESCRIPTION OF EMBODIMENTS

Various specific embodiments of the present disclosure are described below with reference to the accompanying drawings which constitute part of this description. It should be understood that although the terms such as "front", "rear", "upper", "lower", "left" and "right" indicating directions in the present disclosure are used to describe various exemplary structural parts and elements in the present disclosure, these terms used herein are merely used for ease of description and are determined based on the exemplary orientation shown in the accompanying drawings. Since the embodiments disclosed in the present disclosure can be arranged in different directions, these terms indicating directions are only illustrative and should not be considered as limitations.

Figure 1A:
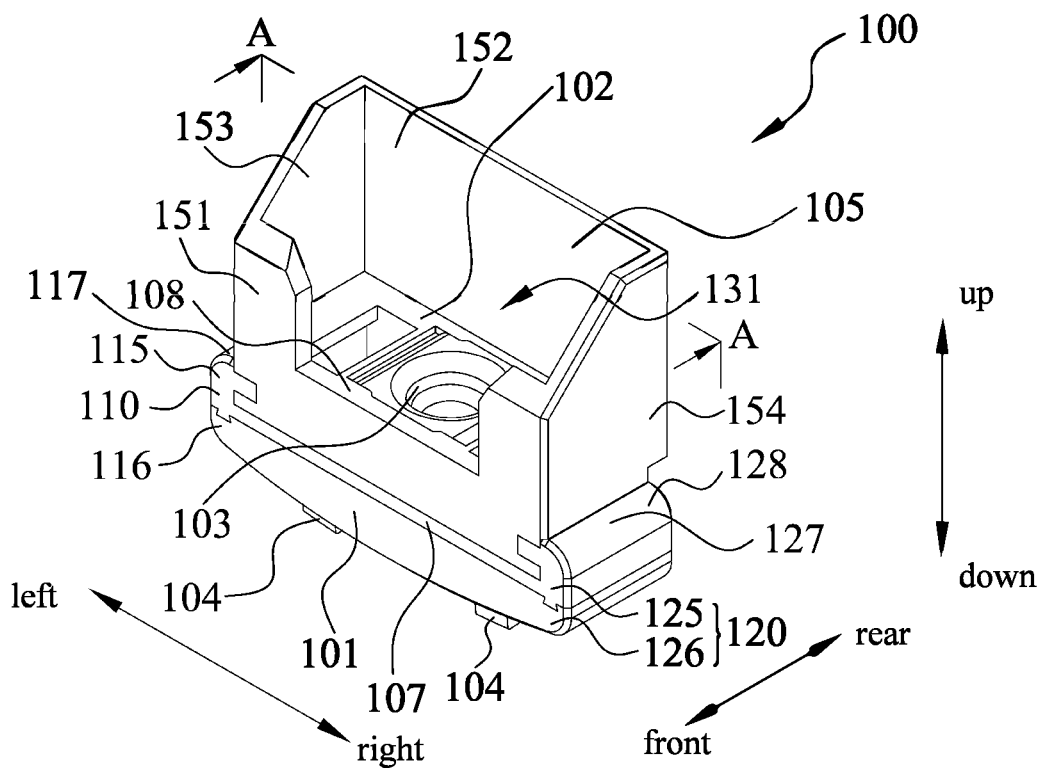
FIG. 1A is an isometric view of an embodiment of a fastener according to the present disclosure.
Figure 1B:
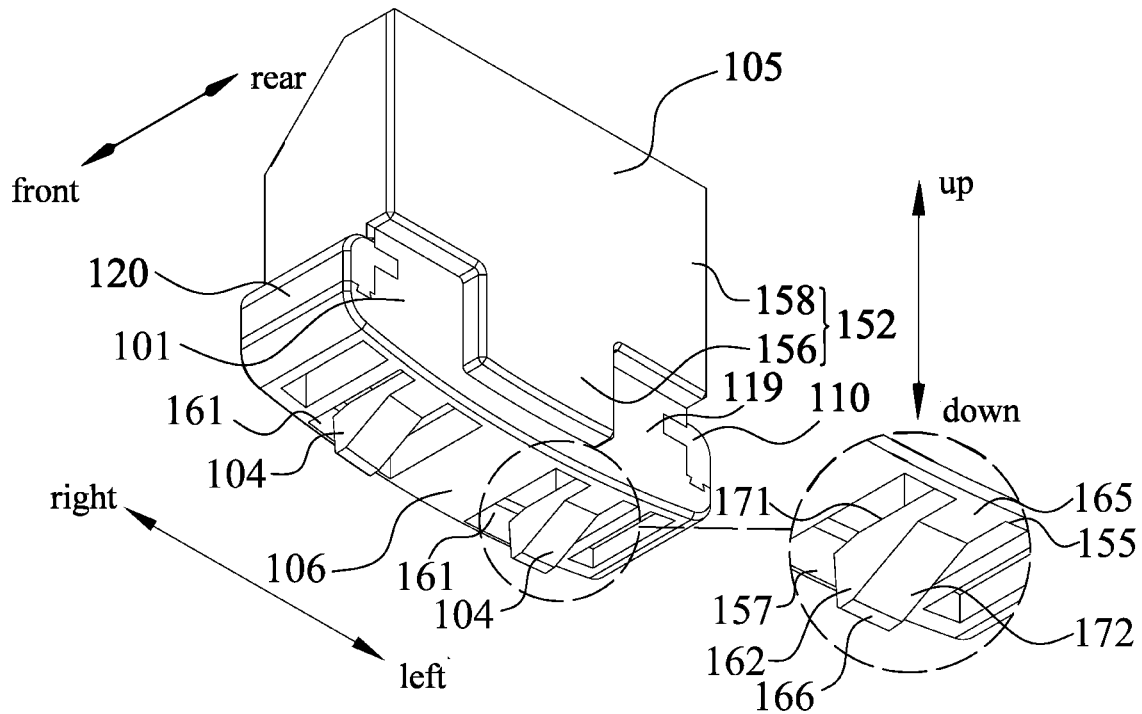
FIG. 1B is another isometric view of the fastener shown in FIG. 1A.
Figure 1C:
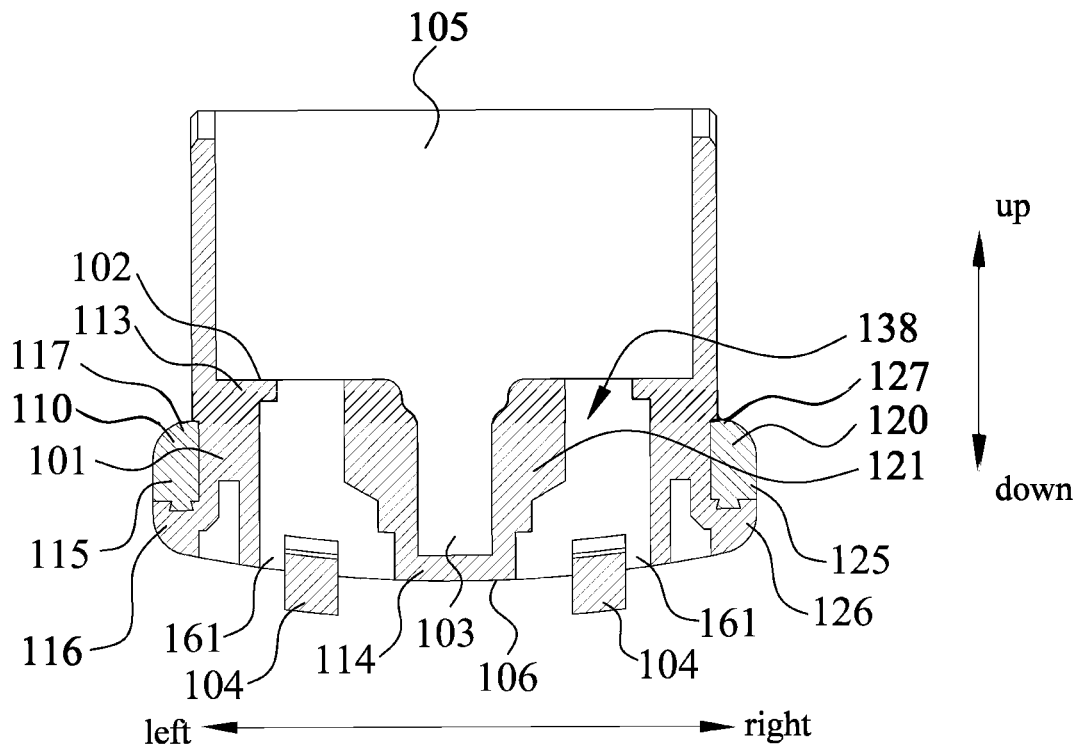
FIG. 1C is a cross-sectional view of the fastener shown in FIG. 1A along line A-A.

FIG. 1A is a perspective view of an embodiment of a fastener 100 according to the present disclosure, which shows the specific structure of the fastener 100 when viewed from top to bottom, FIG. 1B is a perspective view of the fastener 100 shown in FIG. 1A from another perspective, which shows the specific structure of the fastener 100 viewed from bottom to top, and FIG. 1C is cross-sectional view of FIG. 1A along the section line A-A, which shows the internal structure of the fastener 100. As shown in FIGS. 1A to 1C, the fastener 100 comprises a support portion 101, a pair of clamping shoulders 110 and 120, and an insulating peripheral wall 105. The insulating peripheral wall 105 comprises a front side wall 151, a rear side wall 152, a left side wall 153 and a right side wall 154, which are formed by respectively extending upwardly from the peripheral edge of the support portion 101 and enclose a space 131 around a top portion 113 of the support portion 101. The space 131 is used to accommodate electric connectors 391 and 392 (see FIG. 3A) to insulate the electric connectors 391 and 392 from the outside. The pair of clamping shoulders 110 and 120 are arranged on left and right sides (i.e., a first side and a second side) of the support portion 101 and respectively protrude outwardly from the left and right sides of the support portion 101 beyond the left side wall 153 and the right side wall 154 of the insulating peripheral wall 105.

Specifically, as shown in FIGS. 1A and 1C, the support portion 101 has the top portion 113 and a bottom portion 114. As an example, a cavity 138 is provided between the top portion 113 and the bottom portion 114. In this way, the support portion 101 is configured into a hollow shape, which can reduce the weight of the fastener 100 as much as possible and save material. Of course, in other embodiments, the support portion 101 may also be of a solid shape. The support portion 101 is provided with a connecting hole 103, and the connecting hole 103 penetrates the top portion 113 and extends downward into the cavity 138 but does not penetrate the bottom portion 114. An upper surface of the top portion 113 forms a support surface 102, an inner surface of the connecting hole 103 is provided with threads (not shown in the figure), such that the connecting hole 103 can cooperate with a bolt 367 to fix the electric connectors 391 and 392 onto the support surface 102 (see FIGS. 3A and 3B).

Referring to FIGS. 1B and 1C, the outer contour of the bottom portion 114 of the support portion 101 can substantially match the shape of a receiving slot 250 (see the receiving slot 250 in FIG. 2) of a fastener receiving member 230. Specifically, the lower surface of the bottom portion 114 of the support portion 101 is generally in the shape of a symmetrical smooth curved surface, with the left and right sides thereof bending upwardly to form a lowest bottom surface 106 in the middle position. The bottom portion 114 is further provided with two mounting holes 161 in communication with the cavity 138 in the support portion 101, and the two mounting holes 161 are respectively provided in the left and right sides of the bottom surface 106.

As a specific example, a connecting column 121 is provided in the cavity 138 of the support portion 101, and the connecting column 121 is connected between the support surface 102 of the top portion 113 and the bottom surface 106 of the bottom portion 114. The connecting hole 103 is provided in the connecting column 121, with the position of the connecting hole 103 being generally corresponding to the bottom surface 106. Alternatively, in some other embodiments, the connecting hole 103 may also penetrate the bottom portion 114 and be exposed from the bottom surface 106.

An elastic leg 104 is provided at each mounting hole 161 of the bottom portion 114 of the support portion 101. Each elastic leg 104 has a distal end 162 and a proximal end 165. The proximal end 165 thereof is connected to a hole wall edge 155 at the rear side of the mounting hole 161. The distal end 162 thereof is spaced from a hole wall edge 157 at the front side of the mounting hole 161 and is suspended. In the embodiment as shown in the figure, an upper surface 171 of each elastic leg 104 generally horizontally extends from the proximal end 165 to the distal end 162, and a lower surface 172 thereof generally extends obliquely and downwardly from the proximal end 165 to the distal end 162 to form a slope so as to form a downwardly protruding raised portion 166 at the distal end 162. In a free state (i.e., a state in which no external force is exerted), the raised portion 166 of the elastic leg 104 extends downwardly beyond the bottom surface 106 of the support portion 101. The elastic leg 104 is made of an elastic material (e.g., plastic) such that the elastic leg 104 has a certain elasticity. When the distal end 162 of the elastic leg 104 (e.g., at the raised portion 166) receives an upward force, the elastic leg 104 can be elastically deformed, such that the distal end 162 of the elastic leg 104 moves toward the cavity 138 of the support portion 101 until it is no longer beyond the bottom surface 106. Alternatively, the elastic leg 104 may also be configured into a shape in which the upper surface 171 and the lower surface 172 together extend obliquely and downwardly from the proximal end 165 toward the distal end 162 until it is beyond the bottom surface 106 of the support portion 101. In this situation, the elastic leg 104 is of a straight plate shape, without providing a downwardly protruding raised portion at the distal end thereof.

As shown in FIGS. 1A and 1B, the front side wall 151 and the rear side wall 152 of the insulating peripheral wall 105 are arranged opposed to each other, and the height of the rear side wall 152 is higher than that of the front side wall 151. The insulating peripheral wall 105 has an opening 108 in the front side wall 151 to allow the electric connectors 391 and 392 to be disposed on the support surface 102 through the opening 108. In this embodiment, the rear side wall 152 of the insulating peripheral wall 105 is generally "T"-shaped, comprising a body 158 and a protruding portion 156. The body 158 is at an upper portion of the rear side wall 152, and the protruding portion 156 is at a bottom portion of the rear side wall 152. The width of the body 158 is greater than that of the protruding portion 156, such that the rear side wall 152 is generally "T"-shaped. Also, the protruding portion 156 is generally arranged at the rear side of the rear side surface 119 of the support portion 101 and protrudes outwardly relative to the rear side surface 119. The protruding portion 156 is in a shape-fit with a corresponding opening 238 in the fastener receiving member 230 (see FIG. 2) to be connected in the opening 238. The left side wall 153 and right side wall 154 of the insulating peripheral wall 105 are arranged opposed to each other. The left side wall 153 and the right side wall 154 of the insulating peripheral wall 105 are connected between the front side wall 151 and the rear side wall 152, and the upper surfaces of the left side wall 153 and the right side wall 154 respectively extend horizontally from the left and right edges of the rear side wall 152 of the insulating peripheral wall 105 and then obliquely and downwardly to connect to the front side wall 151 of the insulating peripheral wall 105. In this embodiment, alternatively, the insulating peripheral wall 105 may be of any structure that can achieve an insulating effect.

In this embodiment, the support portion 101 and the insulating peripheral wall 105 may be integrally formed from the same material, for example, a thermoplastic resin material, which not only have a good supporting effect but also is able to achieve the insulating effect.

The clamping shoulder 110 is arranged on one side of the fastener 100, and the clamping shoulder 120 is arranged on the opposite side of the fastener 100. From the perspective shown in FIG. 1A, the clamping shoulder 110 is arranged on the outside of the left side of the support portion 101, and the clamping shoulder 120 is arranged on the outside of the right side of the support portion 101. The shape of the clamping shoulders 110 and 120 can match the shape of the receiving slot 250 (see the receiving slot 250 in FIG. 2) of the fastener receiving member 230, such that the fastener 100 can cooperate with the fastener receiving member 230 to allow the fastener 100 to be inserted into the receiving slot 250 of the fastener receiving member 230 and come into contact with the receiving slot 250. In this embodiment, the shape of the clamping shoulders 110 and 120 are symmetric. Detailed description will be given below by taking the clamping shoulder 120 as an example.

As shown in FIGS. 1A and 1B, the clamping shoulder 120 comprises an upper portion 125 and a lower portion 126. The lower portion 126 protrudes rightward from the bottom portion of the support portion 101 and is integrally formed with the support portion 101, and the upper portion 125 is arranged above the lower portion 126 on the right side of the support portion 101. For example, the upper portion 125 may be integrally formed on the lower portion 126 by means of an injection molding process and connected to the right side of the support portion 101. In this embodiment, the upper portion 125 and the lower portion 126 of the clamping shoulder 120 are made of different materials. For example, the upper portion 125 is made of a first elastic material with a certain elasticity, and the lower portion 126 is made of a second elastic material which is the same as that of the support portion 101, with the elasticity coefficient of the first elastic material being greater than that of the elasticity coefficient of the second elastic material. As a specific example, the first elastic material may be a thermoplastic elastomer material, and the second elastic material may be a thermoplastic resin material. It should be noted that, according to the specific requirements of the amount of deformation, the clamping shoulder 120 may also be made of the first elastic material only at the top portion 127 thereof. In this situation, the top portion 127 forms a portion of the upper portion of the clamping shoulder 120. The top portion 127 here refers to the portion with a certain height extending downward from the upper surface 128 of the clamping shoulder 120.

When the upper portion 125 of the clamping shoulder 120 bears a certain downwardly acting force, the upper portion 125 can be elastically deformed to a certain degree. When the upper portion 125 of the clamping shoulder 120 is elastically deformed, the lower portion 126 can provide a certain supporting force. The amount of deformation of the upper portion 125 can compensate for the clearance during the process of fixing the electric connectors 391 and 392 onto the support surface 102 of the fastener 100, which will be described in detail below with reference to FIGS. 4A and 4B.

Similarly, the clamping shoulder 110 on the other side of the fastener 100 also has an upper portion 115 and a lower portion 116, the same as those of the clamping shoulder 120. The lower portion 116 protrudes leftward from the bottom portion of the support portion 101 and is integrally formed with the support portion 101, and the upper portion 115 is arranged above the lower portion 116 on the left side of the support portion 101. The upper portion 115 is made of the first elastic material, and the lower portion 116 is made of the second elastic material. Also, similar to the clamping shoulder 120, according to the specific requirement of the amount of deformation, the clamping shoulder 110 may also be made of the first elastic material only at the top portion 117 thereof.

In this embodiment, the upper portion 115 of the clamping shoulder 110 and the upper portion 125 of the clamping shoulder 120 are connected to each other via the connection portion 107. The connection portion 107 is made of the first elastic material. Thus, by means of providing a suitable injection mold with only one injection port provided at the position corresponding to the connection portion 107, the injection molding of the clamping shoulders 110 and 120 on the left and right sides of the support portion 101 can be completed, which further simplifies the processing.

Those skilled in the art should understand that the upper portion (or the top portion) and the lower portion of the clamping shoulder in this embodiment are only used as directional indications, representing that they are formed of different materials.

Figure 2:
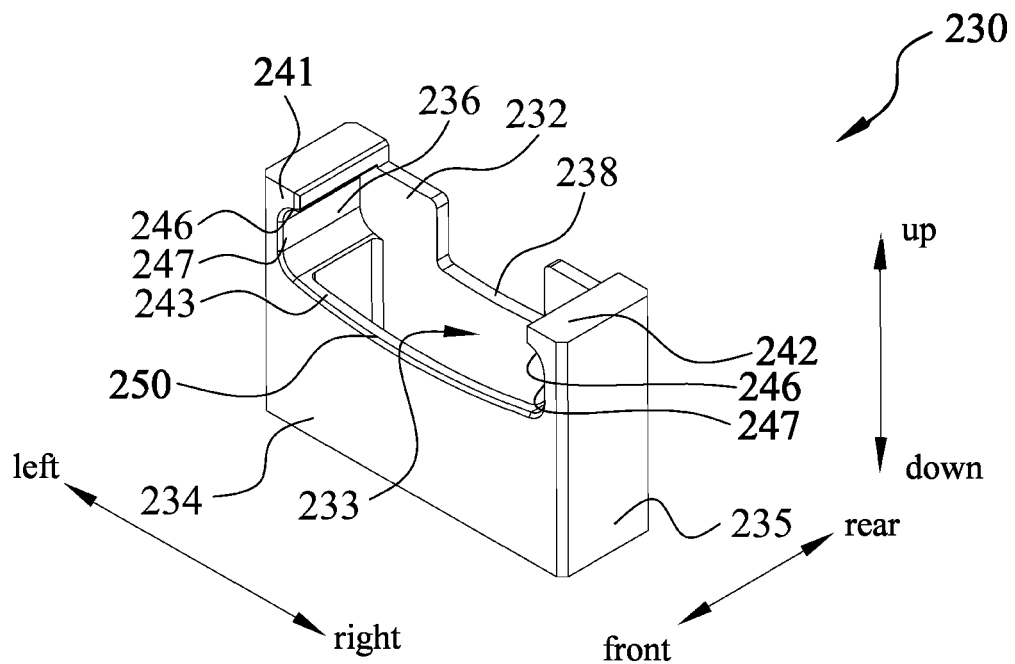
FIG. 2 is an isometric view of an embodiment of a fastener receiving member according to the present disclosure.

FIG. 2 is a perspective view of an embodiment of the fastener receiving member 230 according to the present disclosure, showing the details of a structure in the fastener receiving member 230 for mounting the fastener 100. As shown in FIG. 2, the fastener receiving member 230 is generally of a box shape with an open top portion and has a cavity 233 and a receiving slot 250 therein. The receiving slot 250 is arranged above the cavity 233 and is in communication with the cavity 233. The receiving slot 250 is configured for receiving the bottom portion of the fastener 100 such that the fastener receiving member 230 can cooperate and mounted with the fastener 100. In this embodiment, the fastener receiving member 230 is made of a metal material (such as aluminum).

As shown in FIG. 2, the fastener receiving member 230 has a front side wall 234 and a rear side wall 232 arranged opposite to each other, and a left side wall 236 and a right side wall 235 arranged opposite to each other. The receiving slot 250 is arranged above the cavity 233 and between the left side wall 236 and the right side wall 235. The top portion of the receiving slot 250 forms, on the left side wall 236 and the right side wall 235, a pair of limiting protrusions 241 and 242 protruding toward each other. As described above, the shape of the receiving slot 250 matches the outer contour of the support portion 101 and the clamping shoulders 110 and 120 of the fastener 100. Specifically, the receiving slot 250 forms a generally symmetrical smooth curved surface 243 on the front side wall 234, with left and right sides of the curved surface 243 bending upwardly for cooperating with the bottom portion of the support portion 101 of the fastener 100. The receiving slot 250 forms a recessed portion 247 below each of the limiting protrusions 241 and 242 on the left side wall 236 and the right side wall 235, and the recessed portions 247 are configured for cooperating with the clamping shoulders 110 and 120. In some embodiments, the bottom portion 246 of the limiting protrusions 241 and 242 (i.e., the top portion of the recessed portion 247) may also be made of the first elastic material with elasticity, such as a thermoplastic elastomer material. When the recessed portions 247 accommodate the clamping shoulders 110 and 120, the bottom portion 246 of the limiting protrusions 241 and 242 can be elastically deformed together with the upper portions 115 and 125 of the clamping shoulders 110 and 120. The rear side wall 232 of the fastener receiving member 230 is provided with a downwardly recessed opening 238, and the shape of the opening 238 matches the shape of the protruding portion 156 of the fastener 100.

In the process of mounting the fastener 100 to the fastener receiving member 230, the bottom portion of the fastener 100 can be inserted into the receiving slot 250 of the fastener receiving member 230 from front to rear. The process of mounting the fastener 100 to the fastener receiving member 230 will be described below with reference to FIGS. 1A to 1C and FIG. 2.

At the beginning of inserting the fastener 100 into the receiving slot 250 in a front-to-rear direction (i.e., in a first direction), since the shape of the support portion 101 of the fastener 100 and the shape of the pair of clamping shoulders 110 and 120 match the shape of the receiving slot 250 of the fastener receiving member 230, the recessed portion 247 of the receiving slot 250 can accommodate the clamping shoulders 110 and 120 of the fastener 100, and the bottom portion of the support portion 101 is in contact with the curved surface 243 of the receiving slot 250. As the fastener 100 continues to be inserted into the receiving slot 250, since the raised portions 166 of the elastic legs 104 extend downwardly beyond the bottom surface 106 of the support portion 101, the distal ends 162 of the elastic legs 104 will be pressed by the curved surface 243 at the raised portion 166 to elastically deform upwardly.

After the fastener 100 moves rearward relative to the fastener receiving member 230 to be fully inserted into the receiving slot 250, the rear side wall 152 of the insulating peripheral wall 105 of the fastener 100 cooperates with the rear side wall 232 of the fastener receiving member 230 to be positioned, namely, the protruding portion 156 on the rear side wall 152 of the insulating peripheral wall 105 of the fastener 100 cooperates with the opening 238 in the rear side wall 232 of the fastener receiving member 230. At this moment, the elastic leg 104 of the fastener 100 completely crosses the front side wall 234 and enters into the receiving slot 250. The distal end 162 of the elastic leg 104 is no longer pressed by the curved surface 243, but restores to the free state, extends into the cavity 233 of the fastener receiving member 230 and abuts against the inner surface of the front side wall 234 of the fastener receiving member 230, thereby preventing the fastener 100 from moving back and forth relative to the fastener receiving member 230 in the first direction. Further, the clamping shoulders 110 and 120 are completely accommodated in the recessed portion 247 of the receiving slot 250, so that the fastener 100 cannot move left and right relative to the fastener receiving member 230. Since the distance between the limiting protrusions 241 and 242 is smaller than the maximum distance between the pair of clamping shoulders 110 and 120 (i.e., the distance between the left end of the clamping shoulder 110 and the right end of the clamping shoulder 120), the fastener 100 cannot disengage from the spacing between the limiting protrusions 241 and 242, and cannot move in an up-and-down direction (i.e., a second direction) relative to the fastener receiving member 230 when the clamping shoulders 110 and 120 are not elastically deformed, so that the movement of the fastener 100 relative to the fastener receiving member 230 is restricted. Thus, the fastener 100 and the fastener receiving member 230 can cooperate and mounted together.

Figure 3A:
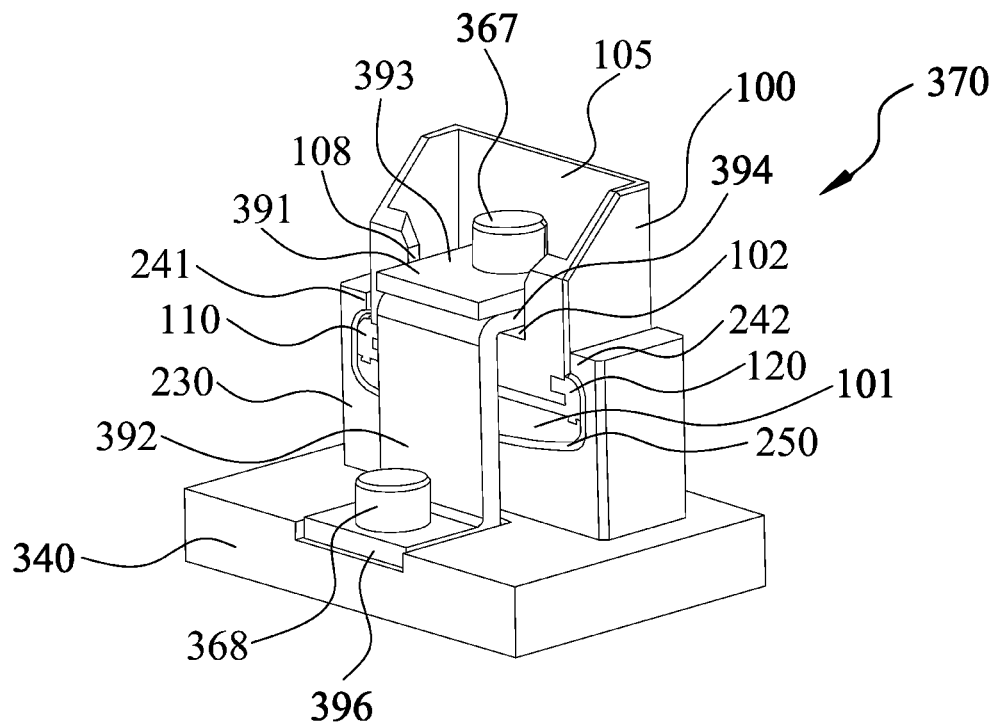
FIG. 3A is an isometric view of an embodiment of a fastener assembly according to the present disclosure after being connected to electric connectors.
Figure 3B:
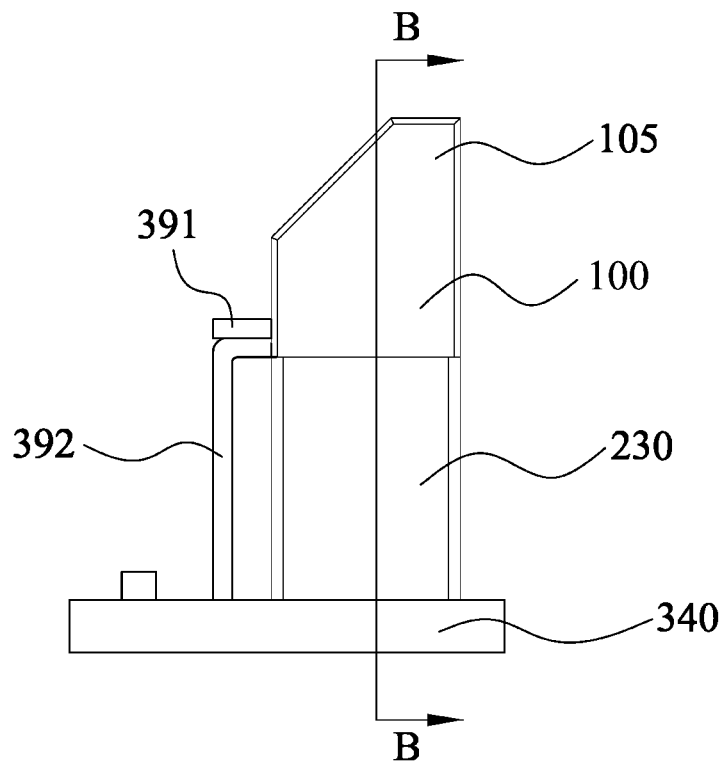
FIG. 3B is a side view of FIG. 3A.

FIG. 3A is a perspective view of an embodiment of a fastener assembly 370 after being connected to electric connectors, and FIG. 3B is a side view of the fastener assembly 370 and the electric connectors shown in FIG. 3A. As shown in FIGS. 3A and 3B, the fastener assembly 370 comprises the fastener 100 and the fastener receiving member 230 mounted together. The fastener assembly 370 is connected to one side of a battery module 340 for supporting and connecting the two electric connectors 391 and 392. To simplify the illustration, only part of the electric connectors 391 and 392 are shown in the figure.

Specifically, a first end 393 of the electric connector 391 and a first end 394 of the electric connector 392 can be accommodated in the space 131 through the front side opening 108 of the insulating peripheral wall 105 of the fastener 100 and supported on the support surface 102 of the fastener 100. A bolt 367 penetrates through the first end 393 of the electric connector 391 and the first end 394 of the electric connector 392, wherein the bolt 367 has external threads that match the internal threads of the connecting hole 103 of the support portion 101, and by means of the fastening of the bolt 367 to the connecting hole 103, the respective first ends 393 and 394 of the two electric connectors 391 and 392 can be connected together and fixed on the support surface 102. A second end 396 of the electric connector 392 is connected to the battery module 340, and as an embodiment, the second end 396 of the electric connector 392 is connected to the battery module 340 via another bolt 368. In some embodiments, the electric connector 392 can be an output electrode copper bar of the battery module 340 for outputting the power of the battery module 340. The electric connector 391 is a high-voltage connection copper bar and serves as a bus bar, with a second end thereof being connected to another electric connector (not shown in the figure). Through the connection between the electric connector 392 and the electric connector 391, the power of the battery module 340 can be transferred out via the electric connector 391. It should be noted that FIG. 3A only schematically shows the battery module 340, those skilled in the art should understand that the battery module 340 may be of other shapes and may be arranged in other positions, for example, at the rear side of the fastener assembly 370, but is not limited to the shape and the position shown in the embodiment.

In the embodiment as shown in FIGS. 3A and 3B, the fastener assembly 370 has been connected to the electric connectors 391 and 392, and the first end 394 of the electric connector 392 abuts against the support surface 102. There is a clearance between the bottom portion of the support portion 101 of the fastener 100 and the curved surface 243 of the receiving slot 250 of the fastener receiving member 230. However, since the electric connectors 391 and 392 abut against the support surface 102, the clearance between the bottom portion of the support portion 101 of the fastener 100 and the curved surface 243 of the receiving slot 250 of the fastener receiving member 230 will not affect the stability of the connection of the electric connectors 391 and 392.

Figure 4A:
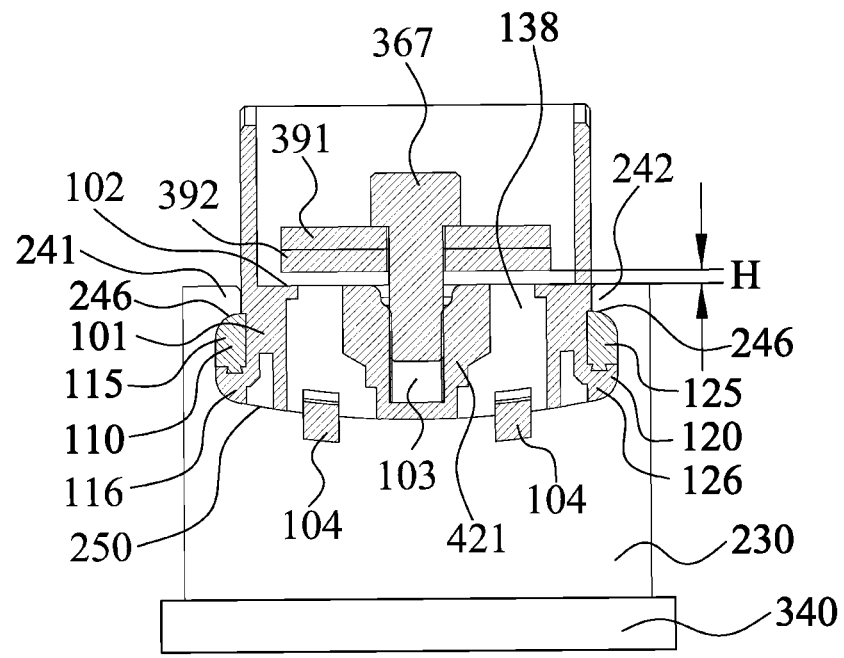
FIG. 4A illustrates a cross-sectional view of one step of a process of connecting electric connectors to the fastener assembly, the electrical connectors are in a state that they are not connected along line B-B of FIG. 3B.
Figure 4B:
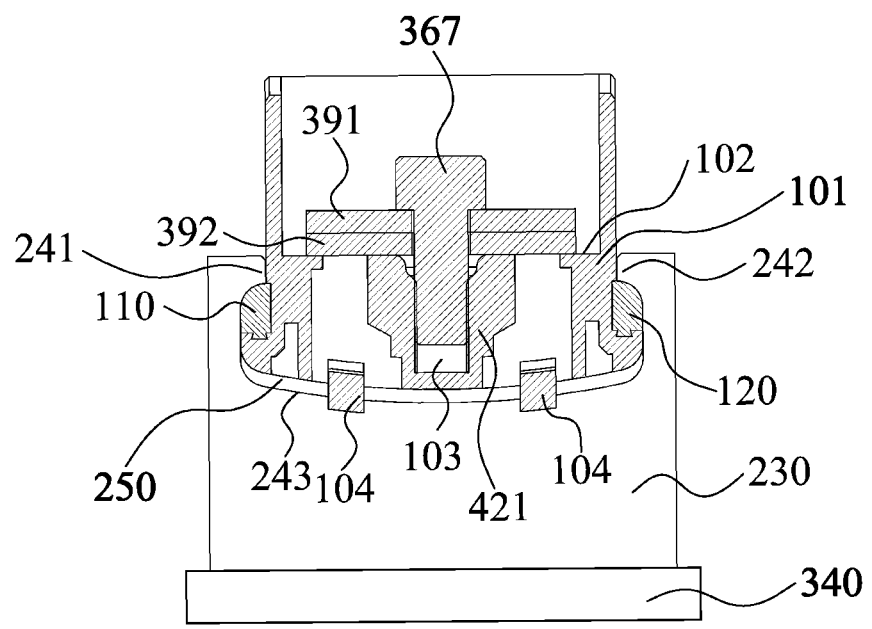
FIG. 4B illustrates a cross-sectional view of another step of a process of connecting electric connectors to the fastener assembly, the electric connectors in a state that they are connected in a place along line B-B of FIG. 3B.

FIGS. 4A and 4B show a process of connecting the electric connectors 391 and 392 to the fastener assembly 370. FIG. 4A shows a cross-sectional view of the fastener assembly 370 and the electric connectors 391 and 392 in a state that they are not connected in place along line B-B in FIG. 3B, in which a clearance H is shown. FIG. 4B shows a cross-sectional view of the fastener assembly 370 and the electric connectors 391 and 392 in a state that they are connected in place along line B-B in FIG. 3B, in which the clearance H is eliminated. For ease of description, in FIGS. 4A and 4B, only the bolt 367, the fastener assembly 370 and the electric connectors 391 and 392 are cut along line B-B, but the fastener receiving member 230 and the battery module 340 are not cut.

As shown in FIG. 4A, the bolt 367 passes through the two electric connectors 391 and 392 and is fastened to the connecting hole 103 of the fastener 100. In the process of screwing the bolt 367 downwardly, the bolt 367 drives the electric connector 391 to move downwardly until it abuts against the electric connector 392. Due to the manufacturing tolerances and mounting errors of the battery module 340 and the fastener receiving member 230, there is a clearance H between the lower surface of the electric connector 392 connected to the battery module 340 and the support surface 102 of the fastener 100 connected to the fastener receiving member 230, and this clearance H will cause the electric connection of the electric connectors 391 and 392 to be unreliable, and easily loosen in environments such as high and low temperatures, vibration and so on, resulting in the failure of electric connection. If the clamping shoulders 110 and 120 are not provided with certain elasticity as the present disclosure, the clearance H may be eliminated by continuing to screw the bolt 367 hard to force the lower surface of the electric connector 392 to abut against the support surface 102. However, this would render the electric connectors 391 and 392 to bend and deform, affecting the reliability of the electric connection.

However, in the present disclosure, in the process of continuing to screw the bolt 367 downwardly to enable the lower surface of the electric connector 392 to abut against the support surface 102, the support portion 101 receives the reaction force of the bolt 367 to be pulled upwardly. Under the action of the reaction force, the upper portions 115 and 125 of the clamping shoulders 110 and 120 and the bottom portion 246 of the limiting protrusions 241 and 242 are pressed against each other. Since the upper portions 115 and 125 of the clamping shoulders 110 and 120 are made of the first elastic material with elasticity, the upper portions 115 and 125 of the clamping shoulders 110 and 120 are elastically deformed. The elastic deformation of the upper portions 115 and 125 enables the fastener 100 to move slightly upwardly as a whole under the action of the reaction force until the support surface 102 abuts against the lower surface of the electric connector 392 to reach the state shown in FIG. 4B.

As shown in FIG. 4B, the upper portions 115 and 125 of the clamping shoulders 110 and 120 are elastically deformed, and the amount of deformation compensates for the clearance H between the lower surface of the electric connector 392 and the support surface 102 such that the clearance H is eliminated. At this moment, although the bottom portion of the fastener 100 leaves the curved surface 243 on the front side wall 234 of the fastener receiving member 230, the electric connectors 391 and 392 are connected to the fastener 100 by the bolt 367, and the position of the electric connectors 391 and 392 relative to the fastener receiving member 230 is fixed, so the fastener 100 cannot move downwardly relative to the fastener receiving member 230. Furthermore, although the fastener 100 slightly moves upwardly, the elastic leg 104 still abuts against the inner surface of the front side wall 234 of the fastener receiving member 230. Therefore, after the bolt 367 is fastened, the fastener 100 will not move back and forth relative to the fastener receiving member 230.

When the electric connectors are connected to the fastener assembly, the upper portion of the clamping shoulder of the fastener can be pressed against the bottom portion of the limiting protrusion of the fastener receiving member. By configuring the upper portion of the clamping shoulder of the fastener to be made of the first elastic material with certain elasticity, the upper portion of the clamping shoulder can be elastically deformed when pressed, and the amount of deformation is used to compensate for the clearance between the electric connector and the support surface of the fastener when the electric connector is connected to the fastener assembly. Thus, the electric connection between the electric connectors can be more stable and reliable so as to avoid poor contact of the electric connectors due to the loosening therebetween in an environment of extreme temperature.

Those skilled in the art should know that, in addition to configuring the upper portion of the pair of clamping shoulders 110 and 120 to be made of the first elastic material with certain elasticity, the bottom portion 246 of the pair of limiting protrusions 241 and 242 of the fastener receiving member 230 may also be made of the first elastic material, or they may be both configured to be made of the first elastic material. Similarly, it is also possible to eliminate the clearance H between the electric connector 392 and the support surface 102 by means of the elastic deformation of the pair of limiting protrusions 241 and 242.

In the fastener 100 shown in FIGS. 1A-4B, the support portion 101 is provided with a connecting hole 103. The inner surface of the connecting hole 103 is provided with threads (not shown in the figure) to form a threaded connection portion, such that the threaded connection portion can cooperate with the bolt 367.

Figure 5:
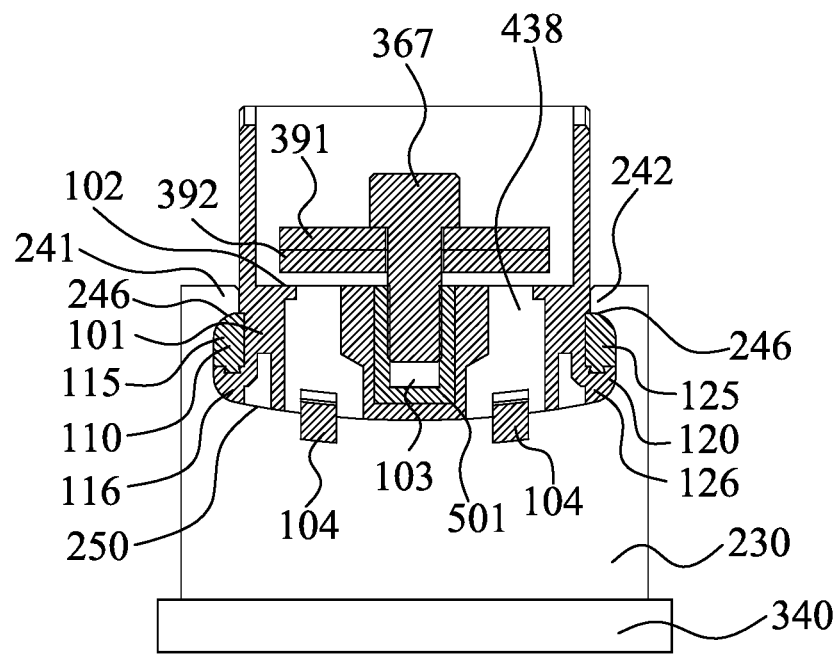
FIG. 5 is a cross-sectional view of a fastener assembly according to the present disclosure that illustrates another embodiment of forming a threaded connection portion.

FIG. 5 is a cross-sectional view of a fastener assembly according to the present disclosure to show a further embodiment of forming the threaded connection portion in the fastener. Different from the fastener 100 shown in FIGS. 1A-4B, the fastener 100 shown in FIG. 5 comprises a connector 501, and the threaded connection portion is formed by the connector 501.

Specifically, as shown in FIG. 5, the fastener 100 further comprises the connector 501. The connector 501 is provided within the connecting hole 103. The connector 501 is internally provided with a screwed hole, and the inner surface of the screwed hole is provided with threads (not shown in the figure) to form a threaded connection portion, such that the threaded connection portion can cooperate with the bolt 367. As an example, the connector 501 may be a connector with an internal thread, such as a nut. Since the fastener 100 of the present disclosure is made of a material such as thermoplastic resin material, the support portion 101 may be injection-molded onto the connector 501 to connect the connector 501 and the support portion 101 together. The connector 501 and the support portion 101 connected together by injection molding are relatively firm, the process is simple, and the cost is low.

Figure 6:
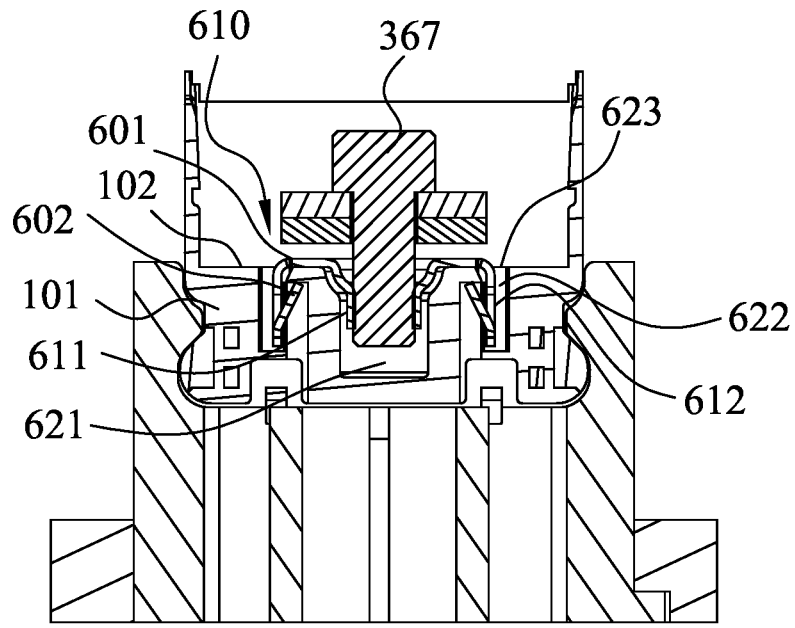
FIG. 6 is a cross-sectional view of a fastener assembly according to the present disclosure to illustrates still another embodiment of forming the threaded connection portion.

FIG. 6 is a cross-sectional view of the fastener assembly according to the present disclosure to show still another embodiment of forming the threaded connection portion in the fastener. Different from the fastener 100 shown in FIG. 5 in which the connector 501 in the fastener 100 and the support portion 101 are connected together by means of injection molding, the connector 610 shown in FIG. 6 and the support portion 101 are connected together via mounting structures.

Specifically, as shown in FIG. 6, the fastener 100 further comprises a connector 610. The connector 610 comprises a connector main body 611 and a pair of mounting structures. The connector main body 611 is generally cylindrical and has a screwed hole. The inner surface of the screwed hole is provided with threads (not shown in the figure) to form a threaded connection portion, such that the threaded connection portion can cooperate with the bolt 367. The pair of mounting structures are arranged on the left and right sides of the connector main body 611. The connector main body 611 of the connector 610 is arranged in the connecting hole 103, and the connector 610 is connected to the support portion 101 via the pair of mounting structures. The pair of mounting structures comprises a pair of extension arms 601 and a pair of biased arms 602. The pair of extension arms 601 respectively extend transversely and outwardly and then downwardly from the left and right sides of the connector main body 611. The downwardly extending portion of the extension arm 601 comprises a window 612. The window 612 transversely penetrates the downwardly extending portion of the extension arm 601 for accommodating the biased arm 602. The biased arm 602 extends upwardly from an edge of the window 612 and extends obliquely relative to the extension arm 601. In other words, the lower end of the biased arm 602 is accommodated in the window 612 and is connected to the extension arm 601. The biased arm 602 is arranged obliquely relative to the vertically extending portion of the extension arm 601, and the upper end of the biased arm 602 is toward the connector main body 611. The biased arm 602 has certain elasticity and can move relative to the vertically extending portion of the extension arm 601. Specifically, the biased arm 602 has an open position and a retracted position. The biased arm 602 is configured such that: when the biased arm 602 does not receive an external force (i.e., in a free state), the biased arm 602 is in the open position in which the biased arm 602 is inclined to the vertically extending portion of the extension arm 601; and when the biased arm 602 receives an external force (i.e., under a force), the upper end of the biased arm 602 can move away from the connector main body 611 and reaches the retracted position, such that the biased arm 602 is generally parallel to the vertically extending portion of the extension arm 601.

As shown in FIG. 6, the support portion 101 comprises a hollow portion (or connecting hole) 621, a pair of arm accommodation cavities 622, and a pair of communication passages 623. The hollow portion 621 is used to accommodate the connector main body 611, the pair of arm accommodation cavities 622 are respectively used to accommodate the pair of biased arms 602 and at least part of the pair of extension arms 601. Specifically, the hollow portion 621 extends downward from the support surface 102 into the support portion 101 but does not penetrate the support portion 101. The pair of arm accommodation cavities 622 are arranged on the left and right sides of the hollow portion 621. The pair of communication passages 623 are arranged corresponding to the pair of arm accommodation cavities 622 and are arranged above the pair of arm accommodation cavities 622. The pair of arm accommodation cavities 622 are in communication with the upper space of the support surface 102 via the pair of communication passage 623. The cross-sectional size of the communication passage 623 is smaller than the cross-sectional size of the arm accommodation cavity 622, and the pair of arm accommodation cavities 622 are arranged closer to the hollow portion 621 than the pair of communication passages 623.

To connect the connector 610 to the support portion 101, the connector main body 611 is aligned with the hollow portion 621, and the vertically extending portions of the pair of extension arms 601 are aligned with the pair of communication passages 623 and then the connector 610 is pressed downwardly. During the downward movement, the pair of biased arms 602 are in contact with the intersection of the support surface 102 of the support portion 101 and the communication passages 623 and receive the external force applied by the intersection. The pair of biased arms 602 are deformed under the external force and move from the open position to the retracted position, such that the pair of biased arms 602 are generally parallel to the pair of extension arms 601. The pair of biased arms 602 in the retracted position can continue to move downward, together with the pair of extension arms 601, through the pair of communication passages 623, until the transversely extending portion of the pair of extension arms 601 abut against the support surface 102. At this moment, the pair of biased arms 602 are accommodated in the pair of arm accommodation cavities 622. Since the walls of the pair of arm accommodation cavities 622 do not abut against the pair of biased arms 602, the pair of biased arms 602 do not receive any external force and move from the retracted position to the open position. Thus, the pair of biased arms 602 in a free state enable the connector 610 to be connected to the support portion 101. Since the pair of biased arms 602 can abut against the upper wall surfaces of the pair of arm accommodation cavities 622, the connector 610 will not disengage from the support portion 101. This mounting method is simple and requires less machining accuracy. As an example, the size of the hollow portion 621, the arm accommodation cavities 622 and the communication passages 623 in the support portion 101 can be slightly larger than the size of the corresponding portion of the connector 610. In this way, when assembled on the support portion, the connector 610 can move back and forth or left and right for a certain distance, which can further reduce the requirements for machining accuracy.

Those skilled in the art could understand that although the connector 610 of the present disclosure comprises a pair of mounting structures, any number of mounting structures are within the scope of protection of the present disclosure.

Furthermore, although the mounting structure in the connector 610 of the present disclosure comprises a pair of extension arms 601 and a pair of biased arms 602, those skilled in the art could understand that any specific structure of the mounting structure is within the scope of protection of the present disclosure. For example, in the present disclosure, the pair of biased arms 602 are arranged obliquely relative to the pair of extension arms 601 and the free ends thereof are close to the connector main body 611, but they can also be arranged obliquely relative to the pair of extension arms 601 with the free ends thereof being away from the connector main body 611, as long as the support portion 101 is provided with a structure matching therewith.

Figure 7:
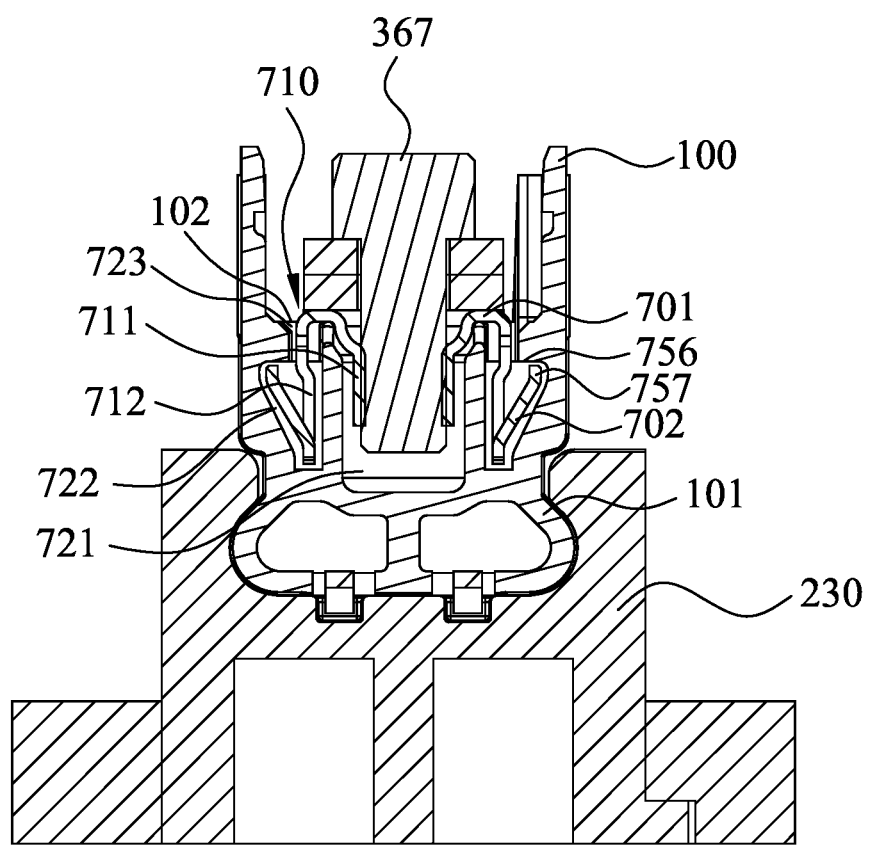
FIG. 7 is a cross-sectional view of a fastener assembly according to the present disclosure to illustrate yet another embodiment of forming the threaded connection portion.

FIG. 7 is a cross-sectional view of the fastener assembly according to the present disclosure to show yet another embodiment of forming the threaded connection portion in the fastener. Similar to the fastener shown in FIG. 6, a connector 710 shown in FIG. 7 is also connected to the support portion 101 via a mounting structure. Different from the fastener shown in FIG. 6, in the connector 710 shown in FIG. 7, the free ends of the extension arms are away from the connector main body.

Specifically, as shown in FIG. 7, the fastener comprises the connector 710 and a pair of mounting structures. The connector 710 comprises a connector main body 711. The connector main body 711 is generally cylindrical and is internally provided with a screwed hole cooperating with the bolt 367. The pair of mounting structures are arranged on the left and right sides of the connector main body 711, and each mounting structure comprises an extension arm 701 and a biased arm 702. The downwardly extending portion of each extension arm 701 comprises a window 712. The pair of biased arms 702 extend from the edge of the corresponding window 712 upwardly and obliquely toward opposite directions, such that their free ends 757 are away from the connector main body 711.

The support portion of the fastener has a hollow portion (or connecting hole) 721, a pair of arm accommodation cavities 722 and a pair of communication passages 723 therein. The hollow portion 721 is used to accommodate the connector main body 711, the pair of arm accommodation cavities 722 are respectively used to accommodate the pair of biased arms 702 and at least part of the pair of extension arms 701, and the pair of communication passages 723 connect the corresponding arm accommodation cavity 722 with the space above the support surface 102. The dimension of the arm accommodation cavity 722 is configured so as to accommodate the biased arm 702 in its open position. When the connector 710 is connected into the support portion 101, the free end 757 of the biased arm 702 abuts against an upper wall surface 756 of the corresponding arm accommodation cavity 722.

In some embodiments of the present disclosure, the fastener is integrally formed by means of an injection molding process, the threaded connection portion is integrally formed with other parts of the fastener by means of injection molding. For example, in the fastener of the embodiment shown in FIGS. 1A-4B, the support portion 101 is integrally formed by means of an injection molding process. In the fastener of the embodiment shown in FIG. 5, the support portion is also connected to the connector by means of an injection molding process. Such fasteners are relatively simple in machining process and low in machining cost.

In some other embodiments of the present disclosure, the threaded connection portion is not injection-molded together with the other parts of the fastener, but is connected to the support portion of the fastener by means of pressing and other assembly processes after the injection molding of the other parts of the fastener. For example, in the embodiments shown in FIGS. 6 and 7, the support portion is formed by means of an injection molding process, while the connector is assembled on the support portion via mounting structures. Such a process can prevent the molten plastic from entering into the threaded connection portion during the injection molding process to affect the shape of the threads in the connecting hole, causing difficulty in screwing the bolt when the fastener is connected to the bolt, or weakening the connection strength.

Also, in some embodiments of the present disclosure, for example, in the embodiment shown in FIGS. 1A to 6, part of the fastener and/or the fastener receiving member can be made of elastic material, such that the fastener can move up and down for a certain distance relative to the fastener receiving member to compensate for the clearance between the electric connector and the support surface of the fastener, thereby preventing the electric connectors from loosening. However, in other embodiments of the present disclosure, for example, in the embodiments shown in FIGS. 6 and 7, the connector can move back and forth or left and right in the support portion for a certain distance, which can facilitate the bolt to be aligned with the hole in the electric connectors and the connecting hole in the fastener at the same time, thereby reducing the requirements of machining accuracy for the fastener and the electric connectors. Those skilled in the art could choose fasteners with different structures according to different machining conditions. In addition, in some embodiments of the present application, for example, in the embodiment shown in FIG. 7, the top/upper portion of the clamping shoulders of the fastener and the bottom portion of the limiting protrusion of the fastener receiving member may not be made of the first elastic material with greater elasticity coefficient, but is made of the second elastic material like the support portion of the fastener.

Although the present disclosure is described with reference to the specific embodiments shown in the accompanying drawings, it should be understood that the fastener and the fastener assembly of the present disclosure can have many variations without departing from the spirit and scope of the teaching of the present disclosure. Those of ordinary skill in the art would also have appreciated that there are different ways to alter the structural details in the embodiments disclosed in the present disclosure, which all fall within the spirit and scope of the present disclosure and the claims.

The invention claimed is:

1. A fastener for supporting and connecting two electric connectors, the fastener comprising:
   a support portion being provided with a support surface on a top portion thereof;
   a connecting hole penetrating the support surface and extending into the support portion;
   at least one elastic leg being provided at a bottom portion of the support portion; and
   a pair of clamping shoulders being respectively arranged on opposing first and second sides of the support portion and formed by protruding outwardly from the support portion,
   wherein the pair of clamping shoulders are made of a first elastic material at least at top portions thereof such that, when the fastener is mounted in a receiving slot of a fastener receiving member, the pair of clamping shoulders can be pressed against the fastener receiving member to provide an amount of elastic deformation, which enables the fastener to move a certain distance toward the electric connectors relative to the fastener receiving member when the fastener is connected to the electric connectors, and
   wherein the at least one elastic leg is configured such that it is elastically deformed during a mounting process of the fastener to the receiving slot of the fastener receiving member so as to enable the fastener to move in a first direction relative to the fastener receiving member, and that it restores an unbiased state after the fastener is mounted to the receiving slot of the fastener receiving member so as to prevent the fastener from moving in the first direction relative to the fastener receiving member.

2. The fastener of claim 1, wherein the at least one elastic leg extends from a third side of the support portion toward a fourth side of the support portion, and at least part of the elastic leg extends downwardly beyond a bottom surface of the support portion below the connecting hole.

3. The fastener of claim 1, wherein the support portion is made of a second elastic material, and the first elastic material has an elasticity coefficient greater than that of the second elastic material.

4. The fastener of claim 3, wherein the pair of clamping shoulders each has an upper portion and a lower portion, the upper portion of the clamping shoulder is made of the first elastic material, and the lower portion of the clamping shoulder is made of the second elastic material, and
   the support portion and the lower portions of the pair of clamping shoulders are integrally formed, and the upper portions of the pair of clamping shoulders are integrally formed on the support portion and the lower portions of the pair of clamping shoulders by means of an injection molding process.

5. The fastener of claim 1, wherein an inner surface of the connecting hole includes threads.

6. The fastener of claim 1, wherein the fastener further comprises a connector arranged in the connecting hole, and the connector includes a screwed hole having threads on an inner surface thereof.

7. The fastener of claim 6, wherein the support portion is connected to the connector by means of injection molding.

8. The fastener of claim 7, wherein the connector comprises a connector main body and a pair of mounting structures, the pair of mounting structures being arranged on opposite sides of the connector main body, the connector main body being arranged in the connecting hole, and the connector being connected to the support portion by means of the pair of mounting structures, and
   wherein the connector main body includes the screwed hole.

9. The fastener of claim 8, wherein the pair of mounting structures each comprises a biased arm,
   wherein one end of the biased arm is connected to the connector main body, and the other end thereof is a free end, and
   wherein the biased arm is configured to enable the connector to be connected to the support portion when in a free state, and the biased arm can be deformed under a force.

10. The fastener of claim 9, wherein the pair of mounting structures each further comprises an extension arm, and
    wherein the extension arm is formed by extending outwardly and then downwardly from the connector main body, the extension arm is provided with a window, and the biased arm extends from an edge of the window upwardly and obliquely relative to the extension arm.

11. The fastener of claim 3, wherein the first elastic material is thermoplastic elastomer, and the second elastic material is thermoplastic resin.

12. The fastener of claim 2, wherein the first side is a left side, the second side is a right side, the third side is a rear side, and the fourth side is a front side.

13. A fastener assembly for supporting and connecting two electric connectors, the fastener assembly comprising:
    a fastener comprising:
       a support portion being provided with a support surface on a top portion thereof;
       a connecting hole penetrating the support surface and extending into the support portion; and
       a pair of clamping shoulders being respectively arranged on opposing first and second sides of the support portion and formed by protruding outwardly from the support portion; and
    a fastener receiving member having a receiving slot, the fastener being inserted into the receiving slot of the fastener receiving member in a first direction, the top portion of the receiving slot being provided with a pair of limiting protrusions protruding toward each other, the limiting protrusion being configured to cooperate with the pair of clamping shoulders to limit movement of the fastener relative to the fastener receiving member in a second direction perpendicular to the first direction, wherein the pair of limiting protrusions are made of a first elastic material at least at bottom portions thereof, and/or the pair of clamping shoulders are made of a first elastic material at least at the top portions thereof such that, when the fastener is mounted in the receiving slot of the fastener receiving member, the pair of clamping shoulders and the fastener receiving member can press against each other to provide an amount of elastic deformation, which enables the fastener to move a certain distance toward the electric connectors relative to the fastener receiving member when the fastener is connected to the electric connectors.

14. The fastener assembly of claim 13, wherein the bottom portion of the pair of limiting protrusions of the fastener receiving member is made of the first elastic material, and the rest of the fastener receiving member is made of a metal material, or the top portion of the pair of clamping shoulders of the fastener is made of the first elastic material, and the rest of the fastener is made of a second elastic material, the first elastic material having an elasticity coefficient greater than that of the second elastic material.

15. A fastener for supporting and connecting two electric connectors, the fastener comprising:

a support portion being provided with a support surface on a top portion thereof;

a connecting hole penetrating the support surface and extending into the support portion; and a pair of clamping shoulders being respectively arranged on opposing first and second sides of the support portion and formed by protruding outwardly from the support portion, wherein the pair of clamping shoulders each has an upper portion and a lower portion, the upper portion being made of a first elastic material such that, when the fastener is mounted in a receiving slot of a fastener receiving member, the pair of clamping shoulders can be pressed against the fastener receiving member to provide an amount of elastic deformation, which enables the fastener to move a certain distance toward the electric connectors relative to the fastener receiving member when the fastener is connected to the electric connectors, wherein the support portion and the lower portion of the pair of clamping shoulders are made of a second elastic material, and the first elastic material has an elasticity coefficient greater than that of the second elastic material, and wherein the support portion and the lower portions of the pair of clamping shoulders are integrally formed, and the upper portions of the pair of clamping shoulders are integrally formed on the support portion and the lower portions of the pair of clamping shoulders by means of an injection molding process.

16. The fastener of claim 15, wherein the first elastic material is thermoplastic elastomer, and the second elastic material is thermoplastic resin.

17. The fastener of claim 15 further comprising a connector arranged in the connecting hole, the connector including a screwed hole having threads on an inner surface thereof.

18. The fastener of claim 17, wherein the connector further includes:

a connector main body arranged in the connecting hole, the connector main body including the screwed hole; and a pair of mounting structures arranged on opposite sides of the connector main body, wherein the connector is connected to the support portion by means of the pair of mounting structures.

19. The fastener of claim 18, wherein the pair of mounting structures each include a biased arm having one end connected to the connector main body and the other end being a free end, and wherein the biased arm is configured to enable the connector to be connected to the support portion when in a free state, and the biased arm can be deformed under a force.

20. The fastener of claim 19, wherein the pair of mounting structures each further include an extension arm that extends outwardly and then downwardly from the connector main body, the extension arm having a window, and wherein the biased arm extends from an edge of the window upwardly and obliquely relative to the extension arm.

* * * * *